Nov. 9, 1965    A. E. SEED    3,216,245
LOAD CELL
Original Filed July 28, 1959    2 Sheets-Sheet 1
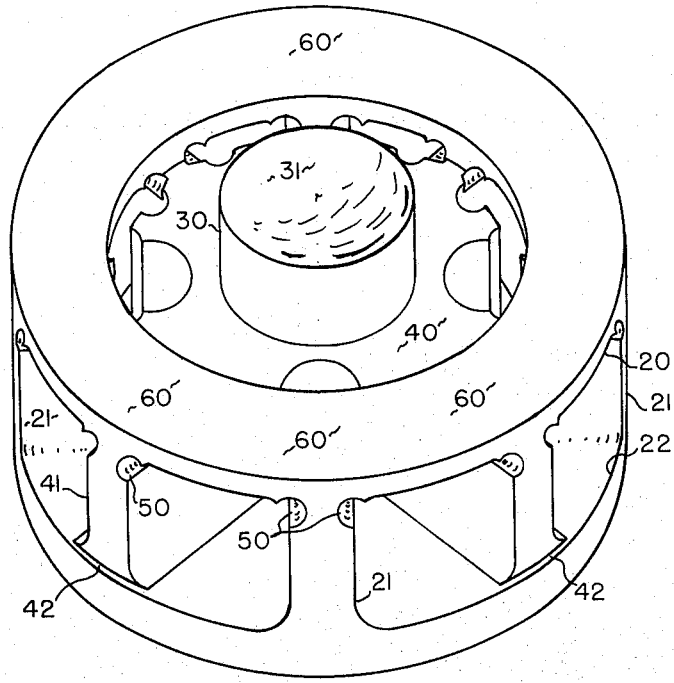
Fig. I
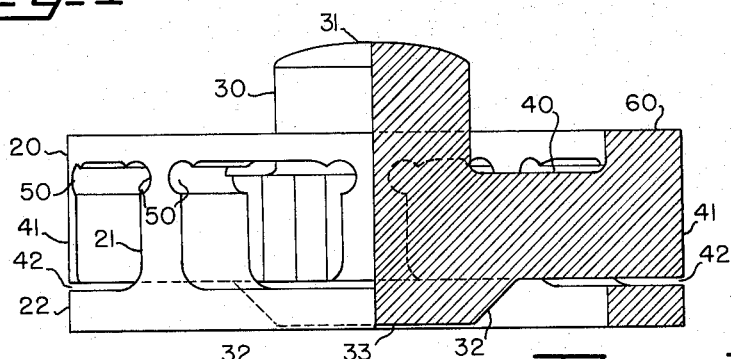
Fig. IV
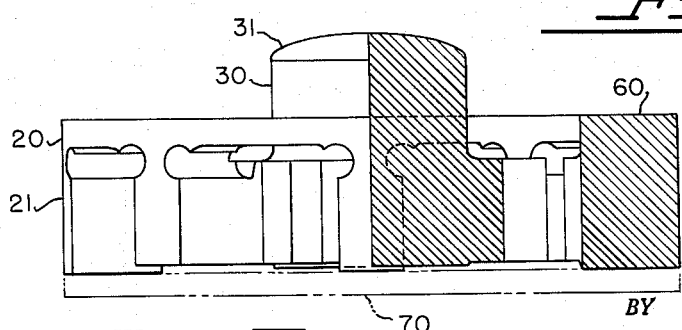
Fig. V
INVENTOR.
ANIESE E. SEED
BY
Marshall, Marshall & Yeasting
ATTORNEYS Nov. 9, 1965 A. E. SEED 3,216,245
LOAD CELL
Original Filed July 28, 1959 2 Sheets-Sheet 2
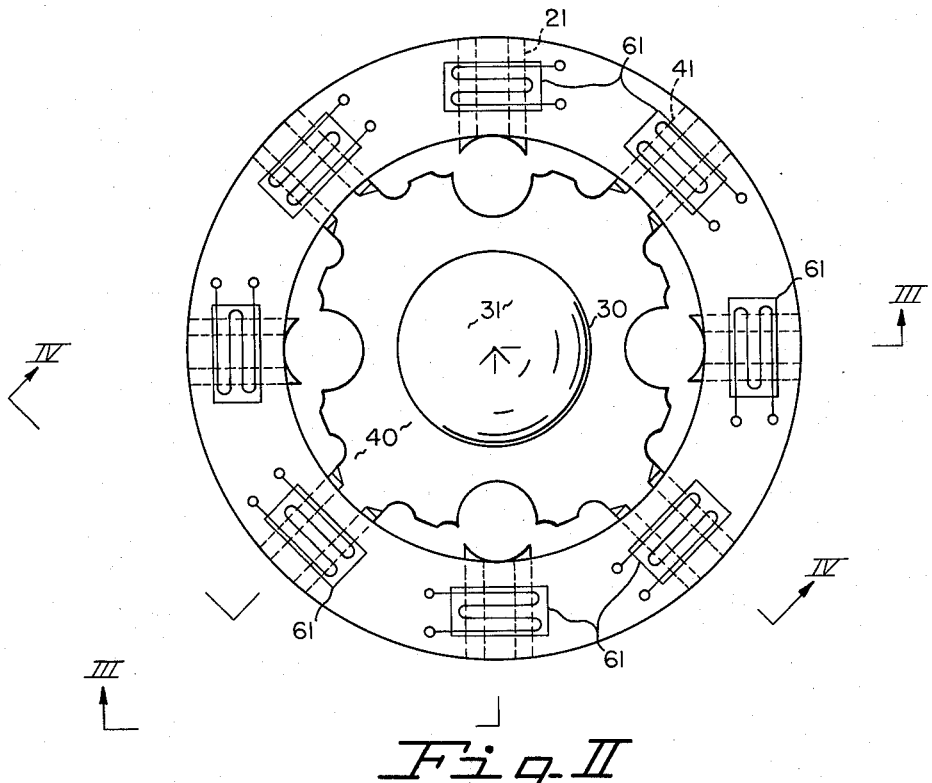
Fig. II
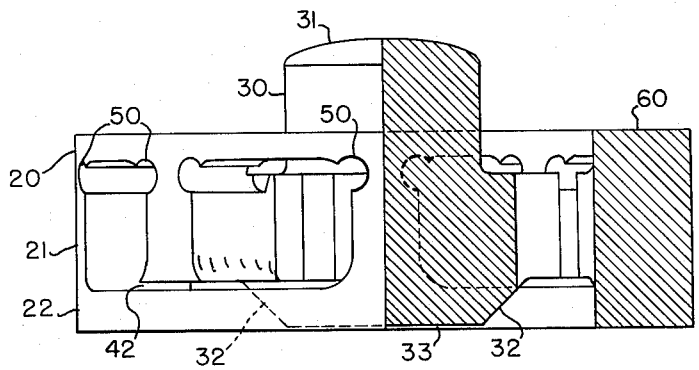
Fig. III
INVENTOR.
ANIESE E. SEED
BY
Marshall, Marshall & Yeasting
ATTORNEYS

United States Patent Office 3,216,245
Patented Nov. 9, 1965

3,216,245
LOAD CELL
Aniese E. Seed, Toledo, Ohio, assignor to Toledo Scale Corporation, Toledo, Ohio, a corporation of Ohio
Continuation of abandoned application Ser. No. 830,098, July 28, 1959. This application July 22, 1963, Ser. No. 297,486
17 Claims. (Cl. 73—141)

This is a continuation of application Serial No. 830,098, filed July 28, 1959.

This invention relates generally to load weighing devices and in particular to load cells of the type which are utilized in conjunction with various strain gage devices to determine the magnitude of a load applied to the load cell.

Load cells are utilized in many different fields where load forces are to be measured or masses are to be weighed. Load cells in conjunction with strain gage devices find particular application in permanent installations in which the load cells are so located that it is impossible or very difficult to provide maintenance for the load weighing devices. In most applications it is impossible to center a load directly over one load cell so that a plurality of the load cells must be used to support and measure a particular load. An outstanding example of this is a load weighing device for trucks. If it is impossible to center the load over one load cell then the off-center loading or torque loading of a load cell and how it reacts thereto is very important.

In still other applications load cells are used to measure loads which transmit rotational torque to the load cell. For example, the screwdown screw of a rolling mill applies a rotational torque to the measuring load cell, creating torque strains within the cell in the load sensitive area.

In still further applications it is necessary to have a load cell that will not be stressed out of its linear response range when an overload is applied thereto. The physical size of a load cell is important in that a standard line of load cells of a particular geometry may perform well at one size while another size responds inefficiently to an applied load.

Accordingly it is an object of this invention to provide an improved load cell which is efficient at all sizes, the cost of which is small, which effectively resists undesired rotational torque forces, and which balances off-center loading.

It is a further object of this invention to provide a load cell device which may be formed from one piece of stock thereby providing a low mechanical hysteresis, which has positive overload stops at the load points and for the load receiving means, has mounting surfaces for strain gage devices on which the stress is uniform, mounting surfaces from which both positive and negative stresses may be obtained, and mounting surfaces may be had, if desired, in which all of the strain gages are on one surface. If the strain gages are applied to one surface the geometry of the load cell of this invention makes it easy to trim all of said strain gages at once.

In accordance with the above objects it is a feature of this invention to provide a load cell comprising an annulus having a plurality of legs depending therefrom to support the annulus. Load receiving means having a cylindrical form for a portion of its length and a rounded load button on its upper extremity plus a tapered portion at its lower extremity is coupled to the annulus by a spider having a plurality of radial legs. In the preferred form of the invention there is a like plurality of dependent and radial legs, all of the legs engaging the under surface of the annulus at spaced intervals. The radial legs of the spider are spaced intermediate the dependent legs. A second annulus may be attached to the dependent legs to provide a base support for the dependent legs and the first mentioned annulus.

The entire structure may be formed or machined from a single piece of stock thereby reducing undesirable hysteresis characteristics in the load cell. Each of the junctions of the under surface of said first-mentioned annulus with each of the legs, whether dependent or radial, may be formed in the shape of a fillet or concavity of a predetermined radius thereby making a mounting surface on the upper surface of the first-mentioned annulus for strain gage devices more sensitive and a more uniform stress area. The load receiving means tapers in diameter at its lower extremity so that with high side loads or off-center loads the load receiving means is operative not to bottom on any base support means before a full load capacity of the load cell is reached. The rounded button area on the upper extremity of the load receiving means tends to balance off-center loads. The radial legs of the spider and the lower extremity of the load receiving means are operative to bottom on a base support upon the occurrence of an overload before any lasting deformity of the load cell occurs.

Mounting surfaces for strain gage devices or other load sensitive devices are preferably provided on the upper surface of the first-mentioned annulus. However, mounting surfaces may be utilized on the upper and/or lower surfaces of the radial legs of the spider. The mounting surfaces on the upper surface of the first-mentioned annulus are preferably directly above each of the plurality of spaced dependent and radial legs attached to the under surface of the annulus. Thus compressive and tensile stresses are available in adjacent sectors of the upper surface of the annulus.

Other objects and advantages will become apparent to those skilled in the art from the following description when taken in conjunction with the accompanying drawings in which:

FIG. I is a view in perspective of a load cell embodying the teachings of this invention;

FIG. II is a plan view of FIG. I;

FIG. III is a front view of FIG. II with a section taken at lines III—III of FIG. II;

FIG. IV is a front view of FIG. II with a section taken at lines IV—IV of FIG. II;

FIG. V is a front view of a second embodiment of the teachings of this invention.

Referring to FIGS. I through IV there is shown a load cell comprising an annulus 20 having a plurality of legs 21 depending therefrom to support the anulus 20. The dependent legs 21 may be attached to a second annulus 22 which functions as a base support for the load cell. A cylinder 30 is utilized as a load receiving means or central load supporting member. The upper extremity 31 of the load receiving means 30 is rounded to balance loads which are applied off-center of the load receiving means 30. As may be best seen in FIGS. III and IV the lower extremity of the load receiving means 30 is tapered at 32 to prevent the load receiving means 30 from grounding on any base support or base means when high side loads are applied to the load receiving means 30 before the load cell reaches its full capacity.

The load receiving means 30 is attached or coupled to the annulus 20 by a plurality of load transmitting members in the form of radial legs 41 which are coupled to the under surfaces of the annulus 20 at spaced intervals intermediate the dependent legs 21. The legs 21 depending from the annulus 20 and the radial legs 41 have fillets or concavities 50 of small radii at the junction of the dependent and radial legs and the under surface of the annulus 20. Mounting surfaces 60 are provided on the upper surface of the annulus 20 for strain gage devices 61 over each of the like plurality of radial and dependent legs 21 and 41.

As may be best seen in FIGS. III and IV a small space 42 is provided between the radial legs 41 and the base annulus 22. A small space 33 is also provided between the lower extremity of the load receiving means 30 and any base means that may be provided below the lower annulus 22. These spaces are provided to allow vertical movement of the load receiving means 30 when receiving a load force on the load button 31. It may be desirable to make the space 33 between the load receiving means 30 and a base below the second annulus 22 a smaller space than the space 42 between the radial legs 41 and the second annulus 22. This is to insure that the load receiving means 30 will bottom slightly before the radial legs 41 and thus will take most of the effects of an overload to prevent deformity of the spring annulus 20 by the bottoming of the radial legs 41 on the second annulus 22.

When a load force is applied axially to the load button 31 the load receiving means 30 through the spider 40 will transmit this axial load through the radial legs 41 to the annulus 20. A compressive load on the load button 31 will cause the mounting surfaces 60 above the radial legs 41 to be under a compressive stress. The adjacent sectors 60 on the upper surface of the annulus 20 above the dependent legs 21 will thus be under a tensile stress. The gages 61 in FIG. II may then be connected into a bridge circuit (not shown) which, when having current applied thereto, will provide an output signal of a magnitude proportional to the load force applied to the load receiving button 31. It is to be noted that although the load cell as shown in the two embodiments of this invention is set up to measure compressive load forces only that the same structure may be utilized to measure tensile load forces by a modification of the load receiving means 30 and the supporting annulus 22.

The use of spring material for the upper annulus 20 with cooperating attached dependent legs 21 and radial legs 41 of the spider 40 plus the fillets or concavities 50 on the under surface of the upper annulus 20 provides mounting surfaces 60 which are maximum stress areas. Further, the stress over each of the dependent and radical legs is uniform and will be measured uniformly if the strain gages 61 are centered above the legs 21 and 41. The adjacent sectors of the upper annulus 20 provide positive and negative stresses in response to a load force on the load receiving means 30. The cooperation of the rounded load button 31 and the coupling effect of the spider 40 tends to reduce undesirable loading effects resulting from a load force which also has a rotational torque. As particularly clearly shown in the plan view of FIG. II and the further views in FIGS. III and IV the load cell may be formed or machined from one piece of stock thereby reducing undesirable mechanical hysteresis effects. If desired the strain gages 61 may all be mounted upon the same piece of backing material or etched thereon thus allowing all of the plurality of strain gages 61 to be mounted on the mounting surfaces 60 at the same time. If, when mounted as a unit, the strain gages 61 are not centered exactly over each of the radial and dependent legs 41 and 42 the output from a measuring bridge circuit utilizing the strain gages 61 will not be appreciably affected since the off-center mounting of each strain gage will be the same and the individual errors will tend to compensate out in the the complete bridge circuit. Further, with the gages mounted as shown in FIG. II it is easier to trim all of the gages at once. The physical size of the load cell has little effect on the linearity of the spring forming the upper annulus 20 and on the linearity of the output signal obtained from a measurement circuit utilizing the strain gages 61.

If desired, it is possible to place strain gages on the unpper and lower surfaces of the radial legs 41. This would provide mounting surfaces for the same number of gages 61 as are shown as 60 on FIG. I. Half the gages so mounted on the radial legs 41 would provide a positive stress while the remaining half would provide negative stress.

Referring to FIG. V there is shown a load cell which provides a second embodiment of this invention. The load cell of FIG. V is very similar in all respects to the load cells shown in FIGS. I through IV with the exception that the lower annulus 22 has been deleted from its attached position to the dependent legs 21 and the load receiving means 30 has been shortened in length so that the dependent legs 21 may rest directly on any type of a base means 70 which may be of a circular or square plate type or other configuration which is suitable. The only requirement for the base means 70 is that it provides a level seating area for each of the dependent legs 21 and bottoming areas intermediate the legs 21 and in the center to receive the radial legs 41 and the load receiving means 30 when the load cell of FIG. V is overloaded. In all other aspects the load cell of FIG. V is similar in construction and identical in function to the load cell shown in FIGS. I through IV in that it provides the same advantages at the same mounting surfaces. The configuration of FIG. V is not a self-contained piece of apparatus as is FIG. I, however, the geometry of FIG. V lends itself more readily to casting the entire load cell if so desired. It is to be noted that while the load cells shown in FIGS. I through V may be machined from a single piece of stock or cast or formed by other means, the load cell may be constructed from the above individual enumerated parts. For example, the upper annulus 20 could have the dependent legs and radial legs 41 and 21 welded or otherwise attached thereto, etc.

In conclusion, it is pointed out that while the illustrated example constitutes a practical embodiment of my invention, I do not limit myself to the exact details shown since modification of the same may be made without departing from the spirit and scope of this invention.

Having described the invention, I claim:

1. A load cell comprising an annulus having a plurality of legs depending therefrom to support said annulus; load receiving means coupled to said annulus by a spider having a plurality of radial legs; there being a like plurality of dependent legs and radial legs; all of said legs engaging the under surface of said annulus at spaced intervals; said radial legs of said spider being spaced intermediate said dependent legs; and means responsive to a load acting on said load receiving means mounted on the upper surface of said annulus.

2. A load cell comprising an annulus having a plurality of legs depending therefrom to support said annulus; load receiving means coupled to said annulus by a spider having a plurality of radial legs; there being a like plurality of dependent legs and radial legs; all of said legs engaging the under surface of said annulus at spaced intervals; said radial legs of said spider being spaced intermediate said dependent legs; and means responsive to a load acting on said load receiving means mounted on the upper surface of said annulus to detect compressive and tensile stresses in adjacent sectors of said annulus.

3. A load cell comprising an annulus having a plurality of legs depending therefrom to support said annulus; load receiving means coupled to said annulus by a spider having a plurality of radial legs; there being a like plurality of dependent legs and radial legs; all of said legs engaging the under surface of said annulus at spaced intervals; said radial legs of said spider being spaced intermediate said dependent legs; base means supporting said dependent legs; said load receiving means being operative to bottom on a supporting surface before said load cell is deformed permanently; and means responsive to a load acting on said load receiving means attached to one surface of said annulus.

4. A load cell comprising an annulus having a plurality of legs depending therefrom to support said annulus; load receiving means coupled to said annulus by a spider having a plurality of radial legs; there being a like plurality of dependent legs and radial legs; all of said legs engaging the under surface of said annulus at spaced intervals; said radial legs of said spider being spaced intermediate said dependent legs; base means supporting said dependent legs; said load receiving means being operative to bottom on a supporting surface and said radial legs being operative to bottom on said base means before said load cell is deformed permanently; and means responsive to a load acting on said load receiving means attached to one surface of said annulus.

5. A load cell comprising an annulus having a plurality of legs depending therefrom to support said annulus; load receiving means coupled to said annulus by a spider having a plurality of radial legs; there being a like plurality of dependent legs and radial legs; all of said legs engaging the under surface of said annulus at spaced intervals; said radial legs of said spider being spaced intermediate said dependent legs; base means supporting said dependent legs; said base means comprising a second annulus; said load receiving means being operative to bottom on a supporting surface before said load cell is deformed permanently; and means responsive to a load acting on said load receiving means attached to one surface of said annulus.

6. A load cell comprising an annulus having a plurality of legs depending therefrom to support said annulus; load receiving means coupled to said annulus by a spider having a plurality of radial legs; there being a like plurality of dependent legs and radial legs; all of said legs engaging the under surface of said annulus at spaced intervals; said radial legs of said spider being spaced intermediate said dependent legs; base means comprising a second annulus; said load receiving means being operative to bottom on a supporting surface before said load cell is sprung beyond its elastic limit; and means responsive to a load acting on said load receiving means attached to one surface of said annulus; said load receiving means, said spider, said radial legs, said first-mentioned annulus, said second annulus, and said dependent legs being formed from a single piece of stock thereby reducing undesirable mechanical hysteresis characteristics in said load cell.

7. A load cell comprising an annulus having a plurality of legs depending therefrom to support said annulus; load receiving means coupled to said annulus by a spider having a plurality of radial legs; there being a like plurality of dependent legs and radial legs; all of said legs engaging the under surface of said annulus at spaced intervals; said radial legs of said spider being spaced intermediate said dependent legs; and means responsive to a load acting on said load receiving means attached to one surface of said annulus; each of the junctions of the under surface of said annulus with each of said legs being a concavity of a predetermined radius.

8. A local cell comprising an annulus having a plurality of legs depending therefrom to support said annulus; load receiving means coupled to said annulus by a spider having a plurality of radial legs; there being a like plurality of dependent legs and radial legs; all of said legs engaging the under surface of said annulus at spaced intervals; said radial legs of said spider being spaced intermediate said dependent legs; base means supporting said dependent legs; said load receiving means being operative to bottom on a supporting surface before said load cell is sprung beyond its elastic limit; and means responsive to a load acting on said load receiving means attached to one surface of said annulus; said load receiving means having a cylindrical form for a portion of its length; said load receiving means having a rounded portion on its upper extremity.

9. A load cell comprising an annulus having a plurality of legs depending therefrom to support said annulus; load receiving means coupled to said annulus by a spider having a plurality of radial legs; there being a like plurality of dependent legs and radial legs; all of said legs engaging the under surface of said annulus at spaced intervals; said radial legs of said spider being spaced intermediate said dependent legs; base means supporting said dependent legs; said load receiving means being operative to bottom on a supporting surface before said load cell is sprung beyond its elastic limit; and means responsive to a load acting on said load receiving means attached to one surface of said annulus; said load receiving means having a cylindrical form for a portion of its length; said load receiving means tapering in diameter at its lower extremity so that with high side loads the load receiving means is operative not to bottom on said base support means before a full load capacity of such load cell is reached.

10. A load cell comprising an annulus having two substantially parallel opposite surfaces; load responsive means mounted on one of said surfaces; means supporting said annulus coupled to the other of said surfaces at a plurality of points; and load receiving means operatively coupled to said other surface of said annulus at a plurality of points interspersed with the points at which the supporting means is coupled; said annulus being operatively flexed by said supporting means and said load receiving means in response to a load.

11. A load cell comprising an annulus having a plurality of legs depending from a surface to support said annulus; load receiving means coupled to said support surface of said annulus by a spider having a plurality of radial legs; and means responsive to a load acting on said load receiving means attached to a surface of said annulus opposite said support surface.

12. A load cell comprising an annulus having a plurality of legs depending from a surface to support said annulus; load receiving means coupled to said support surface of said annulus by a spider having a plurality of radial legs; there being a like plurality of dependent legs and radial legs; and means responsive to a load acting on said load receiving means attached to a surface of said annulus opposite said support surface.

13. A load cell comprising an annulus having a plurality of legs depending from a surface to support said annulus; load receiving receiving means coupled to said support surface of said annulus by a spider having a plurality of radial legs; there being a like plurality of dependent legs and radial legs; said radial legs of said spider being coupled to said annulus intermediate said dependent legs; and means responsive to a load acting on said load receiving means attached to a surface of said annulus opposite said support surface.

14. A load cell comprising an annulus having a plurality of legs depending therefrom to support said annulus; load receiving means coupled to said annulus by a spider having a plurality of radial legs; there being a like plurality of dependent legs and radial legs; all of said legs engaging the under surface of said annulus at spaced intervals; said radial legs of said spider being spaced intermediate said dependent legs; and means responsive to a load acting on said load receiving means attached to a surface of said annulus opposite said support surface.

15. A load cell comprising an annulus; a load receiving means coupled to a first surface of said annulus by a spider having a plurality of radial legs; base means coupled to said first surface at points intermediate said radial leg attachment for supporting said annulus; said load receiving means being operative to bottom on said base means when the full load capacity of said load cell is reached; and means responsive to a load acting on said load receiving means attached to one surface of said annulus.

16. A load cell comprising a load responsive member having two opposite surfaces; a plurality of supporting legs coupled to one of said surfaces; load receiving means coupled to the same surface at a plurality of points interspersed with said supporting legs; and load responsive means mounted on the other of said surfaces at positions opposite to said supporting legs and to the points of coupling of said load receiving means.

17. A load cell as claimed in claim 10 wherein the load receiving means comprises a central load supporting member, a plurality of load transmitting members each of which
 (a) is rigidly connected to the central load supporting member,
 (b) extends radially therefrom and
 (c) is operatively coupled to the annulus by a relatively thin web extending substantially parallel to the axis of the annulus.

References Cited by the Examiner
UNITED STATES PATENTS 3,022,672   2/62   Dimeff et al. _ _ _ _ _ _ _ _ _ _ _  73—398

RICHARD C. QUEISSER, *Primary Examiner.*

UNITED STATES PATENT OFFICE
CERTIFICATE OF CORRECTION

Patent No. 3,216,245                              November 9, 1965

Aniese E. Seed

It is hereby certified that error appears in the above numbered patent requiring correction and that the said Letters Patent should read as corrected below.

Column 3, line 58, for "radical" read -- radial --; column 4, line 2, for "42" read -- 21 --; line 14, for "unpper" read -- upper --; column 5, line 71, for "local" read -- load --.

Signed and sealed this 25th day of October 1966.

(SEAL)
Attest:

ERNEST W. SWIDER
Attesting Officer

EDWARD J. BRENNER
Commissioner of Patents